United States Patent Office 3,598,775
Patented Aug. 10, 1971

3,598,775
EMULSION SYSTEMS ADAPTED TO DEPOSIT
COATINGS BY ELECTROPAINTING
Olin W. Huggard, Rocky River, Ohio, assignor to
Mobil Oil Corporation
No Drawing. Filed Nov. 30, 1967, Ser. No. 686,844
The portion of the term of the patent subsequent to
Sept. 5, 1984, has been disclaimed
Int. Cl. C08g 45/06
U.S. Cl. 260—18  17 Claims

ABSTRACT OF THE DISCLOSURE

Aqueous emulsions particularly adapted for electropainting are provided with the discontinuous oil phase of the emulsion comprising epoxy resin esters in water immiscible organic solvent solution, the oil phase of the emulsion being stabilized utilizing an acidic epoxy resin ester having an acid number of at least 40 as a water dispersible film-forming emulsifying agent. Heat-hardening formaldehyde condensates such as aminoplast resins may be included in the discontinuous oil phase of the emulsion.

The present invention relates to emulsion systems especially adapted to deposit coatings by electropainting, in which both the oil and water phases of the emulsion contain epoxy esters with the water phase ester being modified to include carboxylic acid groups in an amount sufficient to provide water dispersibility so that the water phase resin can serve as an emulsifying agent for the oil phase of the emulsion. When the electrocoating process is carried out, e.g., when a unidirectional electrical current is passed through the emulsion to cause deposition of a paint film at the anode of the system, the epoxy materials utilized in the invention provide superior corrosion resistance and better adhesion of the film to metal substrates.

It is desired to point out that conventional electropainting involves the electrodeposition of a polycarboxylic resin from an aqueous system. The physical and chemical characteristics of the film are, therefore, dependent to a considerable extent upon the need for water dispersibility. This greatly limits the molecular weight and complexity of the resin which is used and the carboxyl groups which enable water dispersibility and provide ionic sites for electrodeposition remain in the film to limit the chemical resistance thereof. The present invention is based on the finding that corrosion resistance and adhesion are best achieved when a substantial proportion of the resin solids which are deposited are constituted by suspended particles of epoxy ester in solution in water immiscible organic solvent, this making it necesary that the continuous aqueous phase in which the epoxy ester solution particles are suspended contain an acidic epoxy ester emulsifying agent in order that the two epoxy ester materials may be deposited together to form a compatible adherent film.

In accordance with the invention, the discontinuous oil phase of the emulsion system is constituted by an organic solvent-soluble epoxy resin ester, adequate flow being obtained by virtue of the fact that the epoxy ester is dissolved in a water immiscible organic solvent, typically an aromatic hydrocarbon solvent. The oil phase may include further components to facilitate subsequent cure, but the essential film-forming agent which enables the superior corrosion resistance and adhesion to be obtained is the epoxy resin ester. With the oil phase of the emulsion system being formulated as indicated above, the aqueous phase of the emulsion has dispersed therein a polycarboxylic resin emulsifying agent, the electrodeposition of the polycarboxylic emulsifying agent causing the emulsified particles of oil soluble resin to be deposited at the anode together therewith. In order that the required water dispersing and emulsifying activities are achieved, the polycarboxylic resin should have a significant acid number of 40 or higher and the resin is used in conjunction with a base such as ammonia or an amine which forms a salt or soap with the acid groups of the emulsifying agent. Still further, and in order that the films which are electrodeposited can properly take advantage of the superior characteristics conferred by the oil phase epoxy resin ester, the polycarboxylic acid emulsifying agent is constituted by an epoxy resin ester which has been modified to include the required acidity.

Referring first to the oil phase of the emulsion, the epoxy resins which are esterified to produce the desired epoxy resin ester may be constituted by any resinous organic polyepoxide. These are preferably, but not necessarily, polyglycidyl ethers of polyhydric organic compounds such as polyhydric phenols and especially dihydric bisphenolic compounds in which a pair of phenolic groups are joined together through an intervening divalent aliphatic group.

The term "resinous" identifies material which forms a film when deposited from organic solvent solution. The epoxy group is the

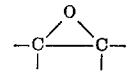

group and the preferred compounds have an equivalency of from 1.2 to 2.0. The term "epoxy equivalency" identifies the average number of epoxy groups per molecule. The particularly preferred materials are polyglycidyl ethers of higher than minimum molecular weight, e.g., those having a molecular weight of from 500 to 7,000, more preferably from 600 to 3,000 and which include recurring secondary hydroxy groups which are also available for esterification. It should also be noted in passing that from the standpoint of an esterification reaction, the epoxy group is the anhydride of a diol so that the functionality of each epoxy group is 2. It will lastly be appreciated that the preferred materials contain no functional groups other than the epoxy and hydroxy groups.

The epoxy resins referred to hereinbefore are esterified by reaction with long chain fatty acid, e.g., a fatty acid containing from 4–20 carbon atoms in the molecule. As is well known, these materials are monocarboxylic and they may be saturated or unsaturated. The most commonly available materials are the fatty acids derived from glyceride oils and the invention includes the fatty acids derived from drying oils including frosting oils and semidrying oils as well as the fatty acids derived from nondrying oils. Particularly preferred fatty acids are those derived from castor oil, dehydrated castor oil, soya oil, linseed oil, tung oil, oiticia oil or safflower oil.

In order to provide the desired coating properties, the epoxy resin is extensively esterified, e.g., at least 25% and proferably at least 50% of the available hydroxy functionality in the epoxy resin is satisfied by esterification. The reaction is continued until substantially all of the acidity is eliminated, e.g., to an acid number of less than 20, preferably less than 10.

Since the esterification of epoxy resins with fatty acids is a matter of common and general knowledge in the art, it will not be discussed in any detail.

The esterification reaction may be conducted in organic solvent or, if it is not, an organic solvent is added since the oil phase in accordance with the invention is a solution in water immiscible organic solvent. It is only by utilizing such water immiscible organic solvents that one can maximize the molecular weight and complexity of the resin in order that it might provide the superior film properties which are desired and still maintain ease of handling with reasonable viscosity. The water immiscible organic solvents also serve in a manner not fully understood to prevent undesirable accumulation of water miscible solvents in a continuous coating operation. Suitable organic solvents possessing only limited water miscibility are aromatic hydrocarbons such as toluene and xylene as well as commercial mixtures thereof such as Solvesso 100 or 150. While aromatic hydrocarbons are particularly useful, water immiscible aliphatic solvents may also be utilized, butanol representing an approximately limiting case for water immiscibility. More preferred are the higher boiling water insoluble alcohols such as isooctyl alcohol. Pine oil represents another water immiscible solvent which may be utilized. The organic solvent or mixture thereof which is selected is employed in an amount of from 5–50% by weight of the oil soluble solution, preferably in an amount of from 10–40% by weight of the oil soluble solution.

Referring more particularly to the epoxy resin esters which are utilized for the water phase of the emulsion, these are based on the same epoxy resins which are utilized in the oil phase and, again, the same fatty acids are used for esterification. However, the nature of the fatty acid and/or the extent of esterification become important in order to enable the epoxy resin ester to be modified to include the desired acidity to permit its adequate dispersion in aqueous medium with the aid of a base and the achievement of effective emulsification capacity since, in preferred practice, the acid epoxy resin ester is the essential emulsifying agent for the discontinuous oil phase of the emulsion.

First, at least some partial esterification of the epoxy resin by the fatty acid is desired in order to insure compatibility between the two different epoxy resins which are utilized in the emulsion. For this purpose, at least 10%, preferably at least 25% of the available hydroxy functionality of the epoxy resin is satisfied by esterification.

When the fatty acid is unsaturated, acidity can be added by adduction without consuming additional hydroxy functionality in the epoxy resin. Accordingly, and when dispersibility is achieved by adduction with an unsaturated acid, the epoxy resin may be completely esterified should this be desired in order to simplify processing. On the other hand, the desired acidity can also be achieved by reacting residual hydroxy groups on the epoxy ester with a polycarboxylic acid which is desirably a monoanhydride to ease the problem of avoiding gelation. The anhydride group reacts at low temperature to form ester groups to generate carboxyl groups and leave other carboxyl groups unreacted and thereby provide the desired acidity without consuming unsaturation. In this way, the fatty acid used to form the epoxy ester need not be unsaturated and the anhydride may be saturated or unsaturated or it may be effectitively saturated as through the use of phthalic anhydride or trimellitic anhydride, but the epoxy ester which is utilized must possess residual hydroxy functionality to permit the reaction with anhydride to take place.

The anhydrides which are used must be a monoanhydride in order that the low temperature reaction can be restricted to the single anhydride group to thereby prevent cross-linking. The reaction is an addition reaction with hydroxy groups in the partial epoxy resin ester which opens the anhydride ring to generate a carboxylic acid group. Succinic anhydride, phthalic anhydride, etc., may be used to provide acidity as a result of carboxyl groups which are generated by reaction. When monoanhydrides of acids having more than two acid groups are used, such as trimellitic anhydride, this provides two carboxyl groups for each trimellitic group which is reacted into the epoxy ester.

The ester groups formed by low temperature adduction with anhydrides may be unstable at elevated temperature, and water scrubbers and the like may be used to remove vaporized acidic material from the vapors generated on baking.

Polycarboxylic acids can also be used, e.g., isophthalic acid, terephthalic acid, adipic acid, dimerized or trimerized fatty acid, acid adducted fatty acids such as fumarated linseed fatty acids, etc. Higher temperatures are required for the reaction, but the ester products are more strongly resistant to removal by baking. At the same time, care must be taken to terminate the reaction prior to gelation. This can be done by following the acid number or through experience.

Referring to the unsaturated carboxylic acids which may be used to provide carboxyl groups for water solubility, any aliphatic alpha, beta-ethylenically unsaturated carboxylic acid is useful. The preferred acids are monoethylenically unsaturated and dicarboxylic. The preferred acids are maleic acid and fumaric acid. Other acids such as crotonic acid, acrylic acid and sorbic acid may be used. The term "acid' is intended to include the acid in the form of its anhydride, e.g., maleic anhydride. The presence of anhydride groups in the final product is not preferred. To obtain best results, the anhydride groups are eliminated from the product as by hydrolysis and/or by esterification. Also, the acid is used in the form of free acid, preferably maleic acid, and reaction conditions are selected to substantially preclude the elimination of water during the formation and bodying of the oil-acid adduct and the consequent formation of the less desired anhydride group.

From the standpoint of the acidity which is required in order to provide adequate water dispersibility and the capacity to function as an emulsifying agent in the presence of a base, it has already been indicated that an acid number of at least 40 should be provided. Preferably, however, an acid number of at least 60 is utilized, though it is normally unnecessary to employ acid number in excess of 200. An acid number of about 300 represents an approximate upper limit in the acidity which may be tolerated.

It should be appreciated that proportions may vary widely in accordance with the invention from the standpoint of the epoxy resin ester used in the oil phase and the acidic epoxy ester which is used in the water phase. On a weight ratio basis, these materials may be used in a weight ratio of from 10/90 to 90/10, but is is preferred that the oil phase epoxy resin ester constitute from 15–60% by weight, based on the total weight of epoxy materials utilized.

Diverse other materials may be included in the oil phase resins such as hydrocarbon resins and materials which are reactive with the functionality in the water phase resin in order to provide a cure after films have been electrodeposited and baked. From this standpoint, particular reference is made to heat-hardening formaldehyde condensates and especially to heat-hardening aminoplast resins which are illustrated by condensates of formaldehyde with urea or melamine or other triazine. These condensates are desirably utilized in the form of ethers as with butanol in order to enhance solvent solubility and permit the formaldehyde condensate to be dissolved together with the oil phase epoxy resin ester in the same water immiscible solvents as are used therefor.

It is particularly preferred to employ aminoplast resins which are not soluble in an aqueous medium containing water miscible solvents, e.g., the aqueous electrocoating bath, but which are stably dispersible in such medium, these being illustrated by low molecular weight materials such as hexamethylol melamine or some other polymethylol melamine containing at least four methylol groups per molecule. While hexamethylol melamines and similar products are soluble in aqueous medium containing water miscible solvents, especially when they are provided in the form of ethers with low molecular weight alcohols, such as methanol or ethanol, alcohol selection can be used to minimize water solubility despite the low molecular weight of the condensate. Thus, by utilizing a proportion of propanol, isopropanol, butanol, or higher boiling alcohol in the alcoholic medium used for etherification, the capacity of the condensate to dissolve in water containing water miscible solvents can be substantially eliminated even though the molecular weight is very low as evidenced by the fluidity of the liquid condensate at room temperature at 100% solids.

The formaldehyde condensates may be utilized in an amount of from 2–40%, preferably from 5–20, based on the weight of the epoxy resin ester.

As will be appreciated, the formaldehyde condensate in the oil phase is heat coreactive with the functional groups which are present in the water phase resin, e.g., the carboxyl groups which are utilized for water dispersion and electrodeposition and also with any remaining hydroxy groups which may be present therein.

There may also be incorporated driers and the like in order to utilize in a cure any unsaturation which may be present in the fatty acids utilized for ester production.

The specific nature of the base used is of secondary significance, but it will be understood that nitrogeneous bases are preferred, these being illustrated by ammonia, by aliphatic amines such as diethyl and triethyl amine and by tris(hydroxy)aminomethane and 2-aminomethyl propanol. The non-nitrogenous bases are less frequently used, but sodium and potassium are broadly useful when used in the form of hydroxides or alkaline salts such as carbonates.

The proportion of base which is used is also of secondary significance, so long as sufficient is used to provide the required water dispersion. Normally, the final bath has a pH of at least 6.0, and usually the pH is much higher, e.g., a pH of at least 7.5, preferably at least 9.0. Preferred operation is normally carried out at a pH in the range of 9.0 to 9.8, most usually from pH 9.2 to 9.6.

As is also well known, electropainting is normally carried out from an aqueous bath which contains only a small proportion of resin solids, e.g., a resin solids content of from 4–30%, preferably from 6–15%.

From the standpoint of the aqueous phase of the emulsion, water miscible organic solvent, known as coupling solvents, are normally used in significant proportion in order to stabilize the aqueous phase of the system, and to enhance flow upon subsequent application and baking. Appropriate water miscible organic solvents are alcohols such as ethanol, glycols such as ethylene glycol, propylene glycol, and butylene glycol, glycol ethers such as 2-ethoxy ethanol and 2-butoxy ethanol, ketones such as methyl ethyl ketone and diacetone alcohol, and branched chain ketones such as Shell Chemical's "Pentoxone."

The electrodeposition process is a matter of common and general knowledge and will not be discussed at length except to point out that the article to be coated is immersed in the aqueous emulsion of the invention and a unidirectional electrical current is passed through the emulsion to cause the formation of a film on the article to be coated which is the anode of the electrical system.

The aqueous emulsions of the invention may be pigmented if desired, suitable pigments being illustrated by lead chromate and/or titanium dioxide. While the particular manner of pigmentation is of secondary importance, it is convenient to add the pigment to the oil phase resin. Barytes, talc, calcium carbonate, iron oxide, titanium dioxide and lead silico-chromate being further illustrative of some of the suitable pigments. The pigment to binder ratio is desirably in the range of from 1:6 to 7:6, but this is not a primary feature of the invention.

Lead silico chromate, especially having an average particle size of 10–15 microns, is particularly preferred to provide superior resistance to corrosion. However, with this particular pigment, it is more advantageous to disperse the same in the aqueous phase of the coating composition in which it can be more stably suspended. The invention will be illustrated in the examples which follow.

EXAMPLE 1

Preparation of oil phase resin

| | |
|---|---|
| Tall oil fatty acid (Load #1) _____pounds__ | 1833 |
| Petroleum hydrocarbon resin (Load #2) (see note 1) _____do____ | 977 |
| Epoxy resin (see note 2) _____do____ | 2075 |
| Aromatic hydrocarbon solvent (boiling range 375–410° F.) _____gallons__ | 431 |

Heat Load #1 to 400° F. in 1½ hours with an inert gas blanket of 2 c.f.m. Add Load #2 in twenty-five minutes and heat to 500° F. in 1½ hours. Increase the inert gas to 25 c.f.m. Hold at 500° F. for about 4 hours to obtain a viscosity of $Z_2$ (Gardner-Holdt) at 60% nonvolatile in the hydrocarbon solvent, and an acid number of 7 (maximum). Yield 965 gallons.

The product has the following final characteristics:

| | |
|---|---|
| Solids _____ | 60 percent. |
| Solvent _____ | Aromatic hydrocarbon solvent. |
| Viscosity _____ | $Z_2$. |
| Acid No. _____ | 7 maximum. |
| Color _____ | 14 to 16. |
| Weight/gallon _____ | 8.27. |

The hydrocarbon resin in the foregoing example may be omitted if desired since it merely represents preferred practice and is not an essential of the invention or of the operability of the example.

Note 1.—The petroleum hydrocarbon resin utilized is an ethylenically unsaturated solid resin having a ball and shouldered ring softening point of 95–100° C. and produced by polymerizing cyclopentadiene. The resin has the following more detailed characteristics: [1]

| | |
|---|---|
| Specific gravity at 25° C. _____ | 1.073. |
| Weight per gallon (average) _____ | 8.93 pounds. |
| Iodine No. _____ | 180. |
| Acid No. _____ | Less than 1. |
| Saponification No. _____ | 0. |
| Ash _____ | Trace. |
| Refractive index at 25° C. _____ | 1.5634. |
| Viscosity, Gardner-Holdt (70% solution in toluene) _____ | I–J. |

Note 2.—The epoxy resin utilized is a substantially diglycidyl ether of 2,2′-bis(p-hydroxyphenylpropane) having an average molecular weight of 1850, an epoxy value of 0.11 equivalent per 100 grams and an hydroxyl value of 0.34 per 100 grams, and a melting point of from 95–105° C.

EXAMPLE 2

Preparation of water phase resin

| | Pounds |
|---|---|
| Linseed fatty acid (Load #1) _____ | 2441 |
| Epoxy resin (Load #2) (see note 3) _____ | 1204 |
| Xylene (Load #3) _____ | 141 |
| Maleic anhydride (Load #4) _____ | 255 |
| 2-butoxy ethanol (Load #5) _____ | 1383 |
| Ammonium hydroxide (28%) (Load #5) _____ | 232 |
| Water (Load #5) _____ | 3915 |

Heat Load #1 to 320° F. in 1¼ hours with an inert gas blanket. Add Load #2 in twenty minutes, then add Load #3. Heat to 465° F. in 3½ hours. The rate of upheat may be restricted by the foaming. Adjust the xylene to obtain a satisfactory reflux if necessary. Hold at 465°

---
[1] Neville LX 1000, a product of Neville Chemical Company of Pittsburg, Pa. may be used if desired.

F. for approximately 2½ hours at which time water will cease being generated. About 86 pounds of water should have been collected at this point. Use inert gas to help strip off the xylene. After 2 additional hours at 465° F. the xylene should cease distilling over. Approximately 107 pounds are collected. The viscosity is $Z_4$–$Z_5$ (Gardner-Holdt) and the acid number is 34.

Cool to 300° F. in 2 hours and add Load #4. Heat to 445° F. in one hour and hold at this temperature for ¾ hour to obtain a viscosity of Y (at 70% non-volatile in mineral spirits), an acid number of 65, and no discoloration in a dimethylaniline test for unreacted maleic anhydride. Cool to 350° F. and reduce in the blend of solvents (Load #5). The resin so-provided is filtered to provide a yield of 1112 gallons at 40% non-volatile solids.

The product has the following final characteristics:

Non-volatile solids ___ 40%.
Solvents _____ 25.0% 2-butoxy ethanol; 4.2% ammonium hydroxide (28%); 70.8% water.
Viscosity _____ $Z_4$.
Acid No. _____ 65.
Color _____ 13 to 14.
Weight/gallon _____ 8.32 pounds.
pH _____ 7.0.

*Note 3.*—The epoxy resin utilized is a substantially diglycidyl ether of 2,2'-bis(p-hydroxyphenylpropane) having a melting point, Durrans' Mercury Method, of 75–85° C., an epoxide equivalent (grams of resin containing one gram-equivalent of epoxide) of 550–700, a Gardner-Holdt viscosity at 25° C. of H–K (40% weight solution in diethylene glycol monobutyl ether).

EXAMPLE 3

An emulsion useful in an electrocoating bath to produce an automotive primer is prepared as follows, all parts being by weight, the emulsion containing 70% non-volatile solids of water phase resin and 30% non-volatile solids of oil phase resin and having a pigment to binder ratio of 1:3.

55.76 parts of lead silico chromate, 55.76 parts of red iron oxide and 56.59 parts of the 40% non-volatile solids water phase resin of Example 2 are dispersed in a pebble mill with 12.68 parts of water. Grind to a Hegman grind rating of 7½ North Standard and then add to the mill 1.64 parts of ammonium hydroxide and 5.44 parts of water. Roll mill ½ hour to provide a mill paste. To the 187.88 parts of mill paste produced above are added, with agitation, 535.28 parts of the 40% non-volatile solids water phase resin of Example 2. Mix thoroughly and then add, using high speed agitation, 167.83 parts of the 60% non-volatile solids oil phase resin of Example 1. The emulsion so produced is then reduced with 109.01 parts of water.

The emulsion so-prepared is further reduced by adding 3 volumes of water to 1 volume of the emulsion. The reduced mixture is then placed under agitation and applied on zinc phosphate treated cold rolled steel panels using a direct electrical current of 150 to 170 volts. Electrodeposition is continued for 1 minute during which the amperage drops e.g. from 5 amps to .20 amp. The deposted films were baked for 20 minutes at 350° F. to provide baked films approximately 0.6 to 0.9 mils in thickness. The films cured by baking as described exhibit good salt spray corrosion resistance. Moreover, when an enamel topcoat is applied over the electrodeposited films of the invention, the primer shows very good exterior durability characteristics upon Florida exposure.

EXAMPLE 4

Example 3 is repeated, but the proportion of pigment is increased to provide a pigment to binder ratio of 1:1, the ratio of lead silico chromate to iron oxide being maintained. The emulsion was satisfactory and electrodeposition is carried out successfully under the same conditions to produce a comparable product having a thickness after baking of 0.5 to 0.6 mil.

While the description set forth hereinbefore has set forth the invention in its preferred form in which the presence of water immiscible solvent in the oil phase of the emulsion is utilized to enable the oil phase resin to be easily handled and to minimize accumulation of water miscible solvent, it is possible to handle the oil phase epoxy ester by dissolving it while hot in the water- and amine-free solution of acidic resin in water miscible organic solvent. Less preferably, and under proper conditions, the hot oil phase epoxy ester can be emulsified directly into the continuous aqueous phase of the emulsion which contains base, the acidic resin emulsifying agent in solution, and water miscible organic solvent. In either event, when the emulsion is formed, the oil phase particles do not contain water immiscible solvent. There is a tendency in the absence of water immiscible solvent to have the water miscible solvent accumulate in the electrocoating bath and this is detrimental to continuous operation, but electrodeposition can still be effectively carried out on a batch or semi-continuous basis and less organic solvent is lost through the stack when the coated product is baked.

The invention is not to be construed by any abstract of disclosure, but its features are instead characterized in the description given hereinbefore and is defined in the claims which follow.

I claim:
1. An aqueous emulsion composition adapted to deposit coatings by electropainting comprising a continuous aqueous phase having dispersed therein an emulsifying agent consisting of a salt of a base with an epoxy resin ester having an acid number of at least 40 and an oil soluble phase stably dispersed in said aqueous phase by means of said emulsifying agent, said oil soluble phase comprising dispersed particles of oil soluble resin comprising epoxy resin ester in solution in water immiscible organic solvent in an amount of from 5–50% based on the weight of said last named epoxy ester solution.

2. An aqueous emulsion as recited in claim 1 in which said dispersed particles of oil soluble resin contain heat-hardening formaldehyde condensate.

3. An aqueous emulsion as recited in claim 2 in which said heat-hardening condensate is an aminoplast resin.

4. An aqueous emulsion as recited in claim 3 in which said aminoplast is insoluble in said aqueous emulsion, but stably dispersible therein.

5. An aqueous emulsion as recited in claim 1 in which said acidic epoxy resin ester has an acid number of from 60–200 and is dispersed as a salt of a nitrogenous base.

6. An aqueous emulsion as recited in claim 1 in which said epoxy resins have a molecular weight in the range of from 500–7000 and have an epoxy equivalency of from 1.2 to 2.0.

7. An aqueous emulsion as recited in claim 6 in which said epoxy resins are a polyglycidyl ether of a bisphenol.

8. An aqueous emulsion as recited in claim 1 in which said epoxy resin in said water immiscible organic solvent is at least 50% esterified.

9. An aqueous emulsion as recited in claim 1 in which said epoxy resin esters are esters with drying oil fatty acids.

10. An aqueous emulsion as recited in claim 1 in which said acidic epoxy resin ester is an ester of the epoxy resin with an unsaturated fatty acid adducted with a monoethylenically unsaturated carboxylic acid.

11. An aqueous emulsion as recited in claim 10 in which said monoethylenically unsaturated acid is maleic acid.

12. An aqueous emulsion as recited in claim 1 in which said acidic epoxy resin ester is substantially free of the anhydride group.

13. An aqueous emulsion as recited in claim 1 in which said water immiscible organic solvent is an aromatic hydrocarbon.

14. An aqueous emulsion as recited in claim 13 in which said aromatic hydrocarbon is mononuclear.

15. An aqueous emulsion as recited in claim 1 in which said water immiscible organic solvent is a high boiling water insoluble alcohol.

16. An aqueous emulsion as recited in claim 1 in which said acidic epoxy resin is formed by the reaction of an hydroxy-functional epoxy resin partial ester with a polycarboxylic acid.

17. An aqueous emulsion as recited in claim 16 in which said polycarboxylic acid is phthalic anhydride.

References Cited

UNITED STATES PATENTS

| | | | |
|---|---|---|---|
| 3,464,939 | 9/1969 | Van Westrenen | 260—18X |
| 3,427,266 | 2/1969 | Phillips et al. | 260—22 |
| 3,364,162 | 1/1968 | Huggard | 260—22 |
| 3,340,172 | 9/1967 | Huggard | 260—18X |
| 3,355,401 | 11/1967 | Tanner | 260—18 |
| 3,308,077 | 3/1967 | Pattison et al. | 260—18X |
| 3,305,501 | 2/1967 | Spalding | 260—18 |
| 3,297,557 | 1/1967 | Huggard | 260—18X |
| 3,293,201 | 12/1966 | Shanade et al. | 260—18X |

FOREIGN PATENTS

| | | | |
|---|---|---|---|
| 6409137 | 2/1966 | Netherlands | 260—22EP |

DONALD E. CZAJA, Primary Examiner

C. W. IVY, Assistant Examiner

U.S. Cl. X.R.

204—181; 260—18, 22, 29.2, 29.4, 31.6, 32.8, 33.2, 33.4, 33.6, 37